United States Patent
Herbst

(10) Patent No.: US 6,471,198 B2
(45) Date of Patent: Oct. 29, 2002

(54) VIBRATION ISOLATOR

(75) Inventor: Paul T. Herbst, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/872,657

(22) Filed: Jun. 1, 2001

(65) Prior Publication Data

US 2002/0030313 A1 Mar. 14, 2002

Related U.S. Application Data

(60) Provisional application No. 60/208,897, filed on Jun. 2, 2000.

(51) Int. Cl.[7] .............................. B60G 11/22; F16F 11/00
(52) U.S. Cl. ........................................ 267/293; 188/381
(58) Field of Search ................................. 267/136, 141, 267/195, 196, 201, 207, 293, 152, 153; 244/17.11, 17.13, 17.25, 17.27

(56) References Cited

U.S. PATENT DOCUMENTS

| | | | | |
|---|---|---|---|---|
| 3,434,708 A | * | 3/1969 | Hawk, Jr. ................ | 267/293 |
| 3,480,268 A | * | 11/1969 | Fishbaugh ................ | 267/141 |
| 3,537,696 A | * | 11/1970 | Webster, Jr. ............. | 267/293 |
| 3,547,426 A | * | 12/1970 | Hart ....................... | 267/293 |
| 3,653,468 A | | 4/1972 | Marshall .................. | 188/1 C |
| 3,759,351 A | | 9/1973 | Purple ..................... | 188/1 C |
| 3,968,862 A | | 7/1976 | Gorges et al. ............. | 188/1 C |
| 4,006,647 A | | 2/1977 | Oonuma et al. ............ | 74/492 |
| 4,074,896 A | * | 2/1978 | Eftefield .................. | 267/139 |
| 4,204,659 A | | 5/1980 | Phillips et al. ............ | 248/562 |
| 4,537,374 A | | 8/1985 | Barnoin et al. ........... | 244/102 R |
| 4,823,923 A | | 4/1989 | Moyer ..................... | 188/376 |
| 4,957,279 A | | 9/1990 | Thorn ..................... | 267/140.5 |
| 4,968,010 A | * | 11/1990 | Odobasic .................. | 267/162 |
| 5,065,959 A | | 11/1991 | Bhatia et al. ............. | 244/54 |
| 5,183,137 A | * | 2/1993 | Siwek et al. .............. | 188/381 |
| 5,257,680 A | | 11/1993 | Corcoran et al. .......... | 267/140.5 |
| 5,332,071 A | | 7/1994 | Duncan .................... | 188/371 |
| 5,535,861 A | * | 7/1996 | Young ..................... | 188/281 |
| 5,538,117 A | | 7/1996 | Bouchez ................... | 188/371 |
| 5,540,549 A | * | 7/1996 | McGuire ................... | 416/140 |
| 5,641,153 A | | 6/1997 | Gwinn ..................... | 267/294 |
| 5,699,984 A | | 12/1997 | Pinault .................... | 244/122 R |
| 5,860,623 A | | 1/1999 | Dunstan et al. ........... | 255/54 |
| 5,921,500 A | | 7/1999 | Ellis et al. ................ | 244/54 |
| 5,927,644 A | | 7/1999 | Ellis et al. ................ | 244/54 |

FOREIGN PATENT DOCUMENTS

| | | |
|---|---|---|
| DE | 2 240 943 | 2/1974 |
| JP | 61-266841 A | 11/1986 |

* cited by examiner

*Primary Examiner*—Christopher P. Schwartz
(74) *Attorney, Agent, or Firm*—Michael M. Gnibus

(57) ABSTRACT

A vibration isolation device comprising a housing with a housing wall that defines a housing chamber, a first spring pack, a second spring pack, and a surface effect damper located between the first and second spring packs. The first and second spring packs and damper being located in the housing chamber. The isolation device further comprises a fuse mechanism which causes the device to act as a hard mount before the fuse is actuated and as a soft mount after the fuse is actuated.

19 Claims, 1 Drawing Sheet

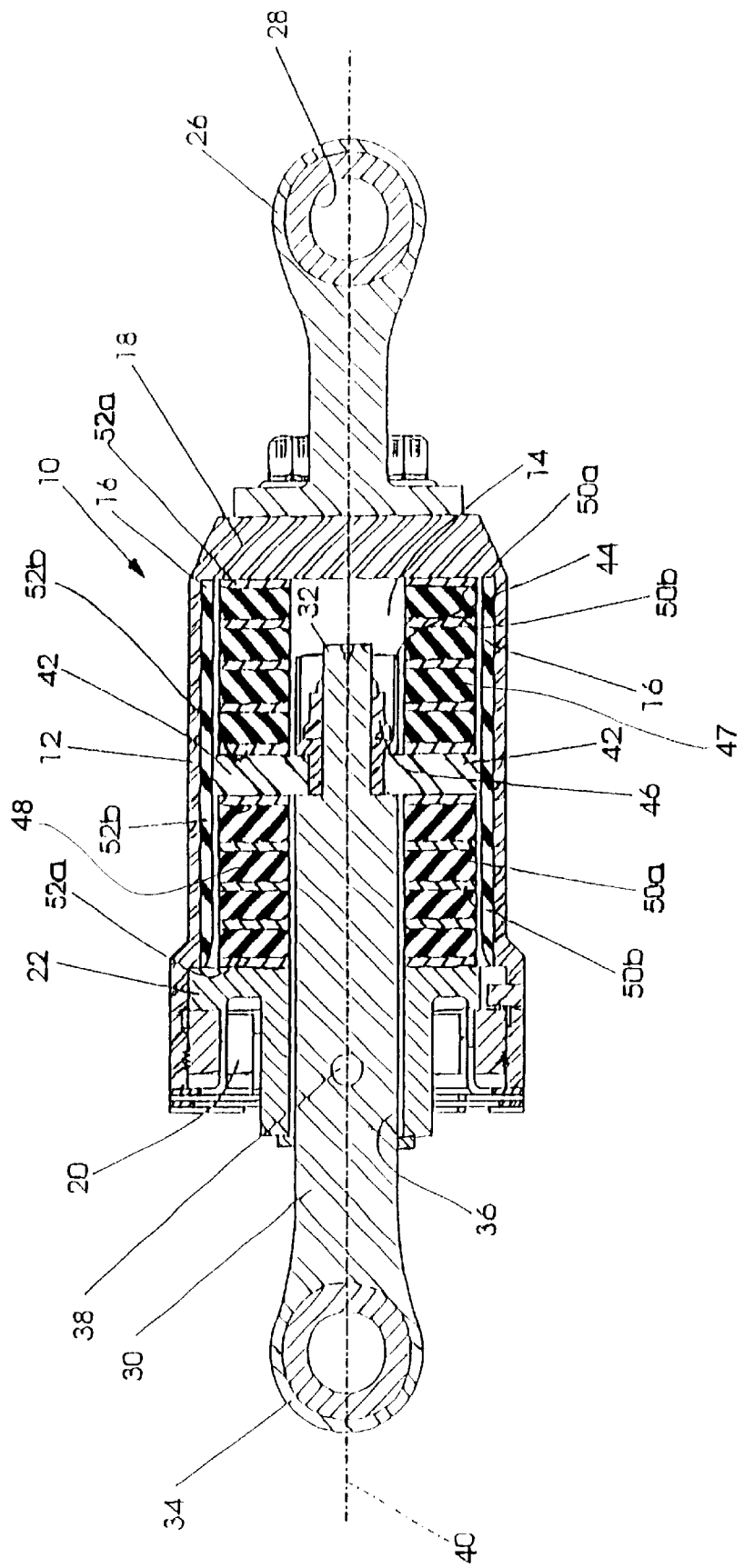

VIBRATION ISOLATOR

CROSS REFERENCE

This application claims priority to Provisional patent application serial No. 60/208,897, filed Jun. 2, 2000.

The invention relates to a vibration isolator, and more specifically the invention relates to an isolator having a first spring pack, a second spring pack, and a surface effect damper between the two spring packs.

BACKGROUND OF THE INVENTION

Jet engines and jet engine components such as gearboxes and fuel oil coolers are frequently hard mounted to other components or to a frame. Over time, the vibration sustained by the hard mounts as well as the demands of the environment where the mounts are located can cause the hard mounts to weaken and fail. If the failed hardmounts do not have a suitable supplemental means for controlling the vibration to the component parts, the jet engines and component parts are likely to sustain significant damage during such mount failure.

The foregoing illustrates limitations known to exist in present systems that are subject to vibratory disturbances. Thus, it is apparent that it would be advantageous to provide an alternative directed to overcoming the limitations set forth above. Accordingly, a suitable alternative solution for limiting the effects of vibratory disturbances in mechanical components is more fully described hereinafter.

SUMMARY OF THE INVENTION

The invention is a device for isolating component vibration when the hard mounts fail. The device includes a housing having a housing wall that defines a chamber, a first spring pack, a second spring pack, and a damper member between the two spring packs. The spring packs and damper are located in the housing chamber.

The housing wall includes an elastomer layer bonded to the housing wall in the chamber and the damper is a surface effect damper that engages the wall to control the damping motion of the device.

The device of the present invention also includes a fuse device that is actuated when a threshold loading event occurs. Before the loading event, the device of the present invention provides a hard mount to the supported component or engine. After the fuse is actuated, the mount becomes a soft mount and isolates vibration of the component. In this way, the device of the present invention will provide vibration isolation until the failed hardmount can be repaired.

The foregoing and other aspects will become apparent from the following detailed description of the invention when considered in conjunction with the accompanying drawing FIGURE.

BRIEF DESCRIPTION OF THE DRAWING FIGURE

The FIGURE is a longitudinal sectional view of the vibration isolator of the present invention.

DESCRIPTION OF THE PREFERRED EMBODIMENT

Turning now to the drawing FIGURE, the vibration isolator of the present invention 10 is shown in longitudinal cross section in the FIGURE. The device 10 comprises a substantially cylindrical housing 12 that defines housing chamber 14. Resilient layer 16 is bonded to the inner surface of housing wall 12 as shown in the FIGURE. The resilient layer is cylindrical and comprises any suitable resilient material such as natural rubber for example. The layer 16 is bonded to the housing using a conventional chemical adhesive known to one skilled in the art such Chemlok adhesive sold by Lord Corporation of Erie, Pa. The housing 12 has a closed end 18 and an open end 20 that is substantially closed by end cap 22.

A rigid connection rod or link 26 is rigidly fixed to the closed housing end 18. The link is attached to the housing by conventional suitable fasteners such as bolts or the like. Additionally, a threaded collar may be tightened down onto the closed housing end to maintain the rod fixed to the housing end. In use, the rod 26 is rigidly fixed to a frame or other rigid structure at the rod end 28. The rigid link remains fixed during use of isolator 10.

An elongate movable link or connection 30 extends into the chamber 14 with a first end 32 located in the chamber 14 and a second end 34 located outside the housing chamber 14. The link 30 is movable along axis 40. The first end comprises an externally threaded stem. The end cap 22 includes a central opening 36 adapted to permit the rod 30 to pass therethrough. The rod end 34 may be fixed in a conventional manner to a frame, gear box or fluid oil cooler for example. A fuse 38 extends through the housing wall 12 and the link body 30 to maintain the link stationary during use of the isolator. When the isolator experiences significant loading, the fuse will be actuated and break, permitting the link to be displaced along axis 40. In this way before the fuse is actuated the device will represent a hard mount and will exhibit characteristics of a hard mount and after the fuse is actuated the device will represent a soft passive mount and will exhibit all of the benefits associated with such mounts. The term fuse used to identify element 38 refers to any mechanism or device that causes the stiffness of the isolator to be changed when the mechanism or device is actuated by a load that exceeds the load rating for the fuse mechanism.

Surface effect damping element 42 is threadably and removably connected to the stem comprising link end 32. The surface effect damping element is made from any suitable friction producing material including but not limited to metal or nylon. Surface effect damping is provided by friction engagement between the outer periphery of the element 42 and the resilient layer 16 as shown in the FIGURE. For purposes of describing the preferred embodiment of the invention the damping element is a disk however the element may have any suitable configuration. The element 42 is threadably connected to a cylindrical link 44 which in turn is threadably connected to stem 32. A locking nut 46 is tightened down onto the stem and against the link to maintain the element 42 fixed along the length of the rod 30. The terms "surface effect", "surface effect damping" and "surface effect damper" as used in this application comprise damping that is a combination of friction, viscous and hysteretic damping resulting from the relative motion of two surfaces, such as relative sliding motion between member 42 and layer 16 for example.

Damping packs 47 and 48 are respectively located between the damping element 42 and closed end 18 and also between the damping element 42 and end cap 22. Neither spring pack is fixed to the link 30. The spring packs are substantially the same and are comprised of a plurality of alternating elastomeric layers 50a and shim layers 50b between the elastomeric layers. The shims are made from a non-extensable material such as a metal. The resilient members are comprised of a suitable resilient material such as rubber for example. Each shim pack includes metal endplates 52a and 52b that enclose the alternating stack of shims and resilient layers. The spring packs limit the displacement of the surface effect damper when the fuse 38 is actuated. The spring packs are of any predetermined stiffness required to support the resultant loading in the event the fuse is broken.

Operation of the isolation device 10 of the present invention will now be described. the rod ends are fixed between a frame and mechanical device in a conventional manner. When a disturbance or loading event at or above a fuse threshold loading value is experienced, the fuse breaks. Before the fuse is broken, the device 10 provides a hard mount between the frame and device. After the fuse is actuated or broken, the device provides a soft mount between the frame and mechanical componetry and in this way isolates the component vibrations. The soft mount is provided by the combination of the spring packs and the surface effect damping between element 42 and layer 16. Before the fuse or stiffness switching mechanism is broken or actuated by a predetermined threshold load, the isolation device 10 is substantially rigid and the connecting arm 30 and damping members 47, 48 and 42 are not freely displaced along axis 40. Because of the relative rigidity of the device, the stiffness of the device is considerable. Once the a threshold load is supplied to the device at the connecting arm, as a result of a blade out condition for example, the fuse or switching mechanism is actuated and the connecting arm and damping elements 47, 48 and 42 are movable and compressible axially to provide the requisite damping forces. Thus the damping is only supplied when the rigid link 38 is broken. The isolator becomes less rigid and therefore the stiffness of the isolator is reduced.

While I have illustrated and described a preferred embodiment of my invention it is understood that this is capable of modification and therefore I do not wish to be limited to the precise details set forth, but desire to avail myself of such changes and alterations that fall within the purview of the following claims.

What is claimed is:

1. A vibration isolation device comprising a housing with a housing wall that defines a housing chamber, a first spring pack, a second spring pack, and a movable damper located between the first and second spring packs, the first and second spring packs and the damper being located in the housing chamber, the vibration isolation device having a first stiffness when the isolation device experiences vibratory loads below a predetermined threshold load and the vibration isolation device having a second stiffness when the isolation device experiences vibratory loads above the predetermined threshold load, the second stiffness having a magnitude that is less than the magnitude of the first stiffness.

2. The vibration isolation device as claimed in claim 1 wherein the spring packs are comprised of a plurality of elastomeric members with shim members separating adjacent elastomeric members.

3. The vibration isolation device as claimed in claim 2 wherein the shim members are comprised of a plurality of relatively inelastic or non-extensible members.

4. The vibration isolation device as claimed in claim 2 wherein the shim members are metal.

5. The vibration isolation device as claimed in claim 1 wherein the damper is comprised of a surface effect damper and wherein said spring packs and surface effect damper are connected to a moveable member.

6. The vibration isolation device as claimed in claim 5 wherein the moveable member is a connecting rod that is moveable along an axis.

7. The vibration isolation device as claimed in claim 1 wherein the damper is a surface effect damper.

8. The vibration isolation device as claimed in claim 7 wherein the housing wall includes an elastomeric layer and the surface effect damper is adapted to engage the elastomeric layer.

9. The vibration isolation device as claimed in claim 1 wherein the device comprises a stiffness switching mechanism.

10. The vibration isolation device as claimed in claim 9 wherein the stiffness switching mechanism is made integral with a movable member.

11. The vibration isolation device as claimed in claim 10 wherein the movable member is a connecting rod, the first and second spring packs and damper being made integral with the connecting rod.

12. A vibration isolation device comprising a housing with a housing wall that defines a housing chamber, a first spring pack, a second spring pack, and a damper located between the first and second spring packs, the first and second spring packs and the damper being located in the housing chamber, the isolation device further comprising a stiffness switching mechanism which causes the device to act as a hard mount before the mechanism is actuated and as a soft mount after the mechanism is actuated.

13. The vibration isolation device as claimed in claim 12 wherein the spring packs are comprised of a plurality of elastomeric members with shim members separating adjacent elastomeric members.

14. The vibration isolation device as claimed in claim 13 wherein the shim members are comprised of a plurality of relatively inelastic or non-extensible members.

15. The vibration isolation device as claimed in claim 13 wherein the shim members are metal.

16. The vibration isolation device as claimed in claim 12 wherein the surface effect damper is connected to a moveable member.

17. The vibration isolation device as claimed in claim 16 wherein the moveable member is a connecting rod that is moveable along an axis.

18. The vibration isolation device as claimed in claim 12 wherein the damper is a surface effect damper.

19. The vibration isolation device as claimed in claim 18 wherein the housing wall includes an elastomeric layer and the surface effect damper is adapted to engage the elastomeric layer.

* * * * *